US011995826B2

(12) United States Patent
Shen et al.

(10) Patent No.: US 11,995,826 B2
(45) Date of Patent: May 28, 2024

(54) AUXILIARY SCREENING SYSTEM AND AUXILIARY SCREENING METHOD FOR A HIP JOINT OF A BABY

(71) Applicant: METAL INDUSTRIES RESEARCH & DEVELOPMENT CENTRE, Kaohsiung (TW)

(72) Inventors: Po-Chih Shen, Kaohsiung (TW); Bing-Feng Huang, Kaohsiung (TW); Jin-Yuan Syue, Tainan (TW); Hsiang-Hsiang Chou, Taipei (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 399 days.

(21) Appl. No.: 17/644,783

(22) Filed: Dec. 16, 2021

(65) Prior Publication Data
US 2023/0196555 A1 Jun. 22, 2023

(51) Int. Cl.
*G06T 7/00* (2017.01)
*G06T 7/33* (2017.01)

(52) U.S. Cl.
CPC ............... *G06T 7/0012* (2013.01); *G06T 7/33* (2017.01); *G06T 2207/10132* (2013.01);
(Continued)

(58) Field of Classification Search
CPC .................. G06T 7/0012; G06T 7/33; G06T 2207/10132; G06T 2207/20021;
(Continued)

(56) References Cited

U.S. PATENT DOCUMENTS

| 4,574,790 A | * | 3/1986 | Wellershaus | A61F 2/80 602/23 |
| 4,901,710 A | * | 2/1990 | Meyer | A61F 5/0193 602/24 |

(Continued)

FOREIGN PATENT DOCUMENTS

| CN | 108537838 B | 12/2020 |
| EP | 3711674 A1 | 9/2020 |

OTHER PUBLICATIONS

Voitl, Peter et al., Ultrasound of the infant hip: manual fixation is equivalent to Graf's technique regarding image quality-a randomized trial, 1999, BMC Pediatrics, pp. 1-8 (Year: 1999).*

*Primary Examiner* — Lewis G West
(74) *Attorney, Agent, or Firm* — CKC & Partners Co., LLC (57) ABSTRACT

An auxiliary screening system and an auxiliary screening method for a hip joint of a baby are provided. The auxiliary screening method includes: collecting plural images of the hip joint; performing an image analysis operation on each of the images of the hip joint to extract plural image features of each of the images of the hip joint and determining whether each of the images of the hip joint is a standard image according to the image features of each of the images of the hip joint; and when at least one of the images of the hip joint is determined as the standard image, plural angle parameters are calculated and the at least one of the images of the hip joint that is determined as the standard image is outputted, in which the angle parameters include values of an angle α and an angle β.

15 Claims, 6 Drawing Sheets

(52) U.S. Cl.
CPC ............... *G06T 2207/20021* (2013.01); *G06T 2207/20081* (2013.01); *G06T 2207/20084* (2013.01); *G06T 2207/30008* (2013.01)

(58) Field of Classification Search
CPC . G06T 2207/20081; G06T 2207/20084; G06T 2207/30008; G06T 7/0014
See application file for complete search history.

(56) References Cited

U.S. PATENT DOCUMENTS

| | | | | |
|---|---|---|---|---|
| 4,913,136 | A * | 4/1990 | Chong | A61F 5/0193 |
| | | | | 602/24 |
| 4,961,737 | A * | 10/1990 | Orlando | A61F 13/511 |
| | | | | 602/24 |
| 4,964,858 | A * | 10/1990 | Livny | A61F 13/84 |
| | | | | 128/DIG. 20 |
| 5,618,264 | A * | 4/1997 | Vasquez | A61F 5/0193 |
| | | | | 602/23 |
| 10,405,834 | B2 | 9/2019 | Jaremko et al. | |
| 11,908,560 | B2 * | 2/2024 | Jacob | G16H 50/30 |
| 2018/0035082 | A1 * | 2/2018 | Patil | A61B 5/45 |
| 2020/0069074 | A1 * | 3/2020 | Oh | A47D 13/027 |
| 2022/0008041 | A1 * | 1/2022 | Pourtahmasi Roshandeh | ............ |
| | | | | G01S 15/8936 |
| 2022/0211533 | A1 * | 7/2022 | Johnson | A61F 5/0125 |
| 2022/0415002 | A1 * | 12/2022 | Sauer | G06T 17/20 |
| 2023/0248261 | A1 * | 8/2023 | Mun | A61B 5/1121 |
| | | | | 600/408 |
| 2023/0329794 | A1 * | 10/2023 | Mcguan | A61B 34/10 |
| 2024/0046498 | A1 * | 2/2024 | Phan | G06V 10/7715 |
| 2024/0076652 | A1 * | 3/2024 | Liu | C12Y 305/04004 |

* cited by examiner

AUXILIARY SCREENING SYSTEM AND AUXILIARY SCREENING METHOD FOR A HIP JOINT OF A BABY

BACKGROUND

Field of Invention

The present invention relates to an auxiliary screening system and an auxiliary screening method for a hip joint of a baby.

Description of Related Art

The first six month after the newborn is born is an important period for observing the development status of the hip joint of the newborn. However, because the imaging quality of ultrasound image usually depends on the experience of the doctor and the newborn is difficult to control, the obtainment of the ultrasound image (hereinafter referred to as standard image) that can be used to identify the development status of the hip joint of the baby needs to be performed by the doctor with sufficient experience.

Therefore, there is a need for developing an auxiliary screening method and an auxiliary screening system for a hip joint of a baby, which do not need to rely on the experience of the doctor to obtain a standard image that can be used to identify the developmental status of the hip joint of the baby.

SUMMARY

The embodiments of present invention provide an auxiliary screening system and an auxiliary screening method for a hip joint of a baby. The present invention can automatically find a standard image according to image features of the ultrasound image of the hip joint of the baby.

In accordance with one or more embodiments of the invention, the auxiliary screening system for the hip joint of the baby includes an ultrasound imaging equipment and an image analyzing equipment electrically connected to the ultrasound imaging equipment. The ultrasound imaging equipment is configured to collect plural images of the hip joint of the baby. The image analyzing equipment is configured to receive the images of the hip joint of the baby. The image analyzing equipment includes a memory and a processor electrically connected to the memory. The memory is configured to store plural instructions. The processor is configured to load the instructions and to execute the instructions to perform operations of: performing an image analysis operation on each of the images of the hip joint of the baby to extract plural image features of each of the images of the hip joint of the baby and determining whether each of the images of the hip joint of the baby is a standard image according to the image features of each of the images of the hip joint of the baby; and when at least one of the images of the hip joint of the baby is determined as the standard image, calculating plural angle parameters of the at least one of the images of the hip joint of the baby that is determined as the standard image and outputting the at least one of the images of the hip joint of the baby that is determined as the standard image. The angle parameters include values of an angle α and an angle β of the hip joint of the baby.

In accordance with one or more embodiments of the invention, the image features respectively correspond to a chondro osseous border of the hip joint, a femoral head of the hip joint, a synovial fold of the hip joint, a joint capsule of the hip joint, a labrum of the hip joint, a cartilaginous roof of the hip joint, a bony roof of the hip joint and a bony rim of the hip joint. The image feature corresponding to the bony roof includes a sub-image feature corresponding to an acetabular roof and a sub-image feature corresponding to an iliac bone.

In accordance with one or more embodiments of the invention, when the processor performs the image analysis operation on each of the images of the hip joint of the baby to extract the image features of each of the images of the hip joint of the baby and determines whether each of the images of the hip joint of the baby is the standard image according to the image features of each of the images of the hip joint of the baby, the processor performs operations of: selecting a target image from the images of the hip joint of the baby; utilizing a first neural network model to automatically divide the sub-image feature corresponding to the acetabular roof and the sub-image feature corresponding to the iliac bone; calculating a first standard line and a second standard line according to the sub-image feature corresponding to the acetabular roof and the sub-image feature corresponding to the iliac bone; and utilizing a second neural network model and a machine learning model to identify the target image according to the image features, thereby determining whether the target image is the standard image.

In accordance with one or more embodiments of the invention, the first neural network model is established by utilizing a Deep Convolutional Neural Network (DCNN). The second neural network model is established by utilizing a Convolutional Neural Network (CNN). The machine learning model is established by utilizing a Support Vector Machine (SVM).

In accordance with one or more embodiments of the invention, when the processor calculates the angle parameters of the at least one of the images of the hip joint of the baby, the processor performs operations of: calculating a third standard line according to the second standard line and the image feature corresponding to the labrum; calculating the angle α of the hip joint of the baby according to the first standard line and the second standard line; and calculating the angle β of the hip joint of the baby according to the second standard line and the third standard line.

In accordance with one or more embodiments of the invention, the at least one of the images of the hip joint of the baby that is determined as the standard image is drawn with the first standard line, the second standard line and the third standard line.

In accordance with one or more embodiments of the invention, when the processor determines that each of the images of the hip joint of the baby is not the standard image, the processor outputs a warning message to notify that the hip joint of the baby is abnormal.

In accordance with one or more embodiments of the invention, the auxiliary screening method for the hip joint of the baby is performed by the auxiliary screening system for the hip joint of the baby. The auxiliary screening method for the hip joint of the baby includes: collecting plural images of the hip joint of the baby by using an ultrasound imaging equipment; performing an image analysis operation on each of the images of the hip joint of the baby to extract plural image features of each of the images of the hip joint of the baby and determining whether each of the images of the hip joint of the baby is a standard image according to the image features of each of the images of the hip joint of the baby; and when at least one of the images of the hip joint of the baby is determined as the standard image, calculating plural angle parameters of the at least one of the images of the hip joint of the baby that is determined as the standard image and outputting the at least one of the images of the hip joint of the baby that is determined as the standard image. The angle parameters include values of an angle α and an angle β of the hip joint of the baby.

In accordance with one or more embodiments of the invention, the image features respectively correspond to a chondro osseous border of the hip joint, a femoral head of the hip joint, a synovial fold of the hip joint, a joint capsule of the hip joint, a labrum of the hip joint, a cartilaginous roof of the hip joint, a bony roof of the hip joint and a bony rim of the hip joint. The image feature corresponding to the bony roof includes a sub-image feature corresponding to an acetabular roof and a sub-image feature corresponding to an iliac bone.

In accordance with one or more embodiments of the invention, operations of performing the image analysis operation on each of the images of the hip joint of the baby to extract the image features of each of the images of the hip joint of the baby and determining whether each of the images of the hip joint of the baby is the standard image according to the image features of each of the images of the hip joint of the baby include: selecting a target image from the images of the hip joint of the baby; utilizing a first neural network model to automatically divide the sub-image feature corresponding to the acetabular roof and the sub-image feature corresponding to the iliac bone; calculating a first standard line and a second standard line according to the sub-image feature corresponding to the acetabular roof and the sub-image feature corresponding to the iliac bone; and utilizing a second neural network model and a machine learning model to identify the target image according to the image features, thereby determining whether the target image is the standard image.

In accordance with one or more embodiments of the invention, the first neural network model is established by utilizing a Deep Convolutional Neural Network (DCNN). The second neural network model is established by utilizing a Convolutional Neural Network (CNN). The machine learning model is established by utilizing a Support Vector Machine (SVM).

In accordance with one or more embodiments of the invention, operations of calculating the angle parameters of the at least one of the images of the hip joint of the baby include: calculating a third standard line according to the second standard line and the image feature corresponding to the labrum; calculating the angle α of the hip joint of the baby according to the first standard line and the second standard line; and calculating the angle β of the hip joint of the baby according to the second standard line and the third standard line.

In accordance with one or more embodiments of the invention, the auxiliary screening method for the hip joint of the baby further includes: drawing the first standard line, the second standard line and the third standard line on the at least one of the images of the hip joint of the baby that is determined as the standard image.

In accordance with one or more embodiments of the invention, the auxiliary screening method for the hip joint of the baby further includes: performing a model establishing operation to establish the second neural network model and the machine learning model. The model establishing operation includes: providing plural training images of the hip joint of the baby, in which the training images of the hip joint of the baby include plural labelled image features, in which the labelled image features respectively correspond to the chondro osseous border of the hip joint, the femoral head of the hip joint, the synovial fold of the hip joint, the joint capsule of the hip joint, the labrum of the hip joint, the cartilaginous roof of the hip joint, the bony roof of the hip joint and the bony rim of the hip joint; and utilizing the training images of the hip joint of the baby to training the CNN and the SVM, thereby obtaining the second neural network model and the machine learning model.

In accordance with one or more embodiments of the invention, when determining that each of the images of the hip joint of the baby is not the standard image, a warning message is outputted to notify that the hip joint of the baby is abnormal.

In order to let above mention of the present invention and other objects, features, advantages, and embodiments of the present invention to be more easily understood, the description of the accompanying drawing as follows.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identify units or data described by the same terminology, but are not referred to particular order or sequence.

Figure 1:
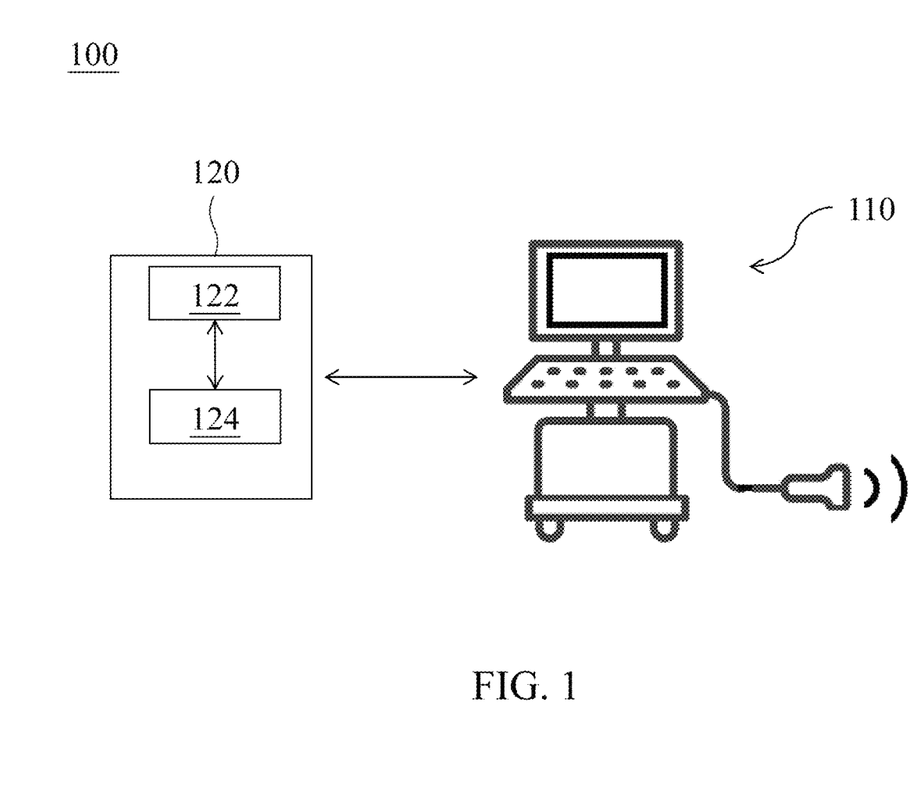
FIG. 1 illustrates a block diagram of an auxiliary screening system for a hip joint of a baby according to some embodiments of the present invention.

FIG. 1 illustrates a block diagram of an auxiliary screening system 100 for a hip joint of a baby according to some embodiments of the present invention. The auxiliary screening system 100 for the hip joint of the baby an ultrasound imaging equipment 110 and an image analyzing equipment 120. The ultrasound imaging equipment 110 is configured to collect plural images of the hip joint of the baby (e.g., pediatric patient). For example, the ultrasound imaging equipment 110 can scan the hip joint of the pediatric patient by using an ultrasound probe 112, thereby obtaining images of the hip joint of the pediatric patient. In some embodiments of the present invention, the ultrasound imaging equipment 110 scans the hip joint of the pediatric patient at a frequency of 30 images per second and scans for about 30-60 seconds.

The image analyzing equipment 120 is electrically connected to the ultrasound imaging equipment, thereby receiving the images of the hip joint of the baby which are obtained by the ultrasound imaging equipment 110. The image analyzing equipment 120 is configured to perform an image analysis operation on each of the images of the hip joint of the baby to extract plural image features of each of the images of the hip joint of the baby and to determine whether each of the images of the hip joint of the baby is a standard image according to the image features of each of the images of the hip joint of the baby. In some embodiments of the present invention, the said image features respectively correspond to a chondro osseous border of the hip joint, a femoral head of the hip joint, a synovial fold of the hip joint, a joint capsule of the hip joint, a labrum of the hip joint, a cartilaginous roof of the hip joint, a bony roof of the hip joint and a bony rim of the hip joint. The bony roof of the hip joint includes at least one portion of an acetabular roof and an iliac bone, and therefore the image feature corresponding to the bony roof of the hip joint includes a sub-image feature corresponding to the acetabular roof and a sub-image feature corresponding to the iliac bone.

The image analyzing equipment 120 can be implemented by a computer device. In some embodiments of the present invention, the image analyzing equipment 120 includes a memory 122 and a processor 124. The memory 122 is configured to store plural instructions. The processor 124 is electrically connected to the memory 122. The processor 124 is configured to load the instructions and to execute the instructions to perform the image analysis operation. In some embodiments of the present invention, the image analyzing equipment 120 can include a storage device and a display screen. The storage device can be, for example, a hard disk for storing information. The display screen can be, for example, a liquid crystal display (LCD) for displaying information.

Figure 2:
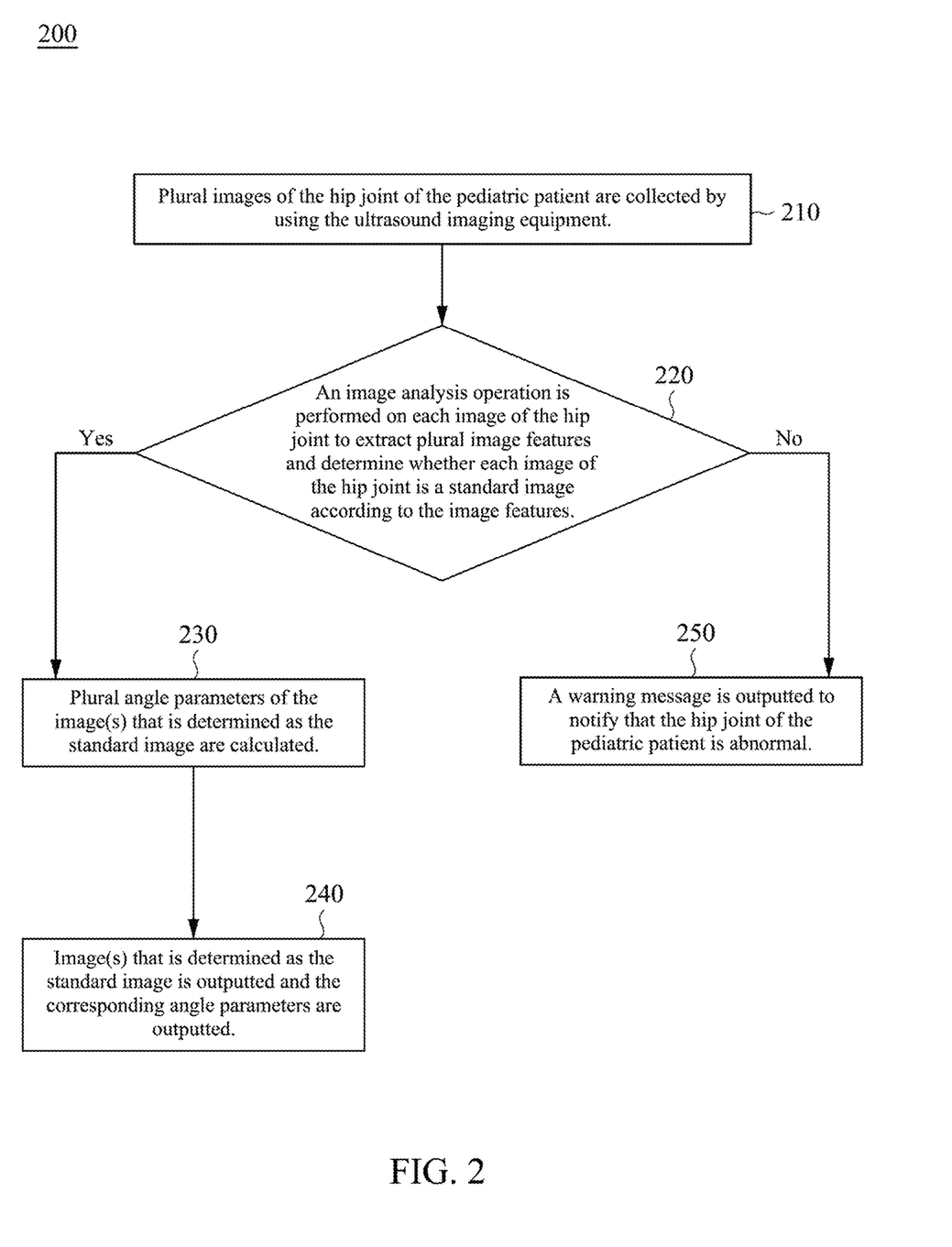
FIG. 2 illustrates a flowchart of an auxiliary screening method for the hip joint of the baby according to some embodiments of the present invention.

FIG. 2 illustrates a flowchart of an auxiliary screening method 200 for the hip joint of the baby according to some embodiments of the present invention. First, a step 210 is executed to collect plural images of the hip joint of the baby by using the ultrasound imaging equipment 110. Then, a step 220 is executed to perform the image analysis operation on each of the images of the hip joint of the baby. Regarding the step 220, the processor 124 extracts plural image features of each of the images of the hip joint of the baby and determines whether each of the images of the hip joint of the baby is a standard image according to the image features of each of the images of the hip joint of the baby. In other words, in the step 220, the processor 124 determines whether each of the images of the hip joint of the baby is a standard image.

Then, a step 230 is executed. When at least one of the images of the hip joint of the baby is determined as the standard image, the processor 124 calculates plural angle parameters of the at least one of the images of the hip joint of the baby that is determined as the standard image. The said angle parameters include values of an angle α and an angle β of the hip joint of the baby.

Then, a step 240 is executed to output the at least one of the images of the hip joint of the baby that is determined as the standard image and to output the corresponding angle parameters. For example, the display screen is controlled by the processor 124, such that the display screen displays the image(s) of the hip joint of the baby that is determined as the standard image and the displayed image(s) is marked with values of the angle α and the angle β of the hip joint of the baby.

When the processor 124 determines that each of the images of the hip joint of the baby is not the standard image, a step 250 is performed, such that the processor 124 outputs a warning message to notify that the hip joint of the baby is abnormal. For example, in the step 250, the display screen is controlled by the processor 124, such that the display screen displays the warning message to point out that each of the images of the hip joint of the baby is not the standard image, and therefore the hip joint of the baby may be abnormal. In some embodiments of the present invention, the abnormality shown by the warning message includes but is not limited to Developmental Dysplasia of the Hip (DDH).

Figure 3:
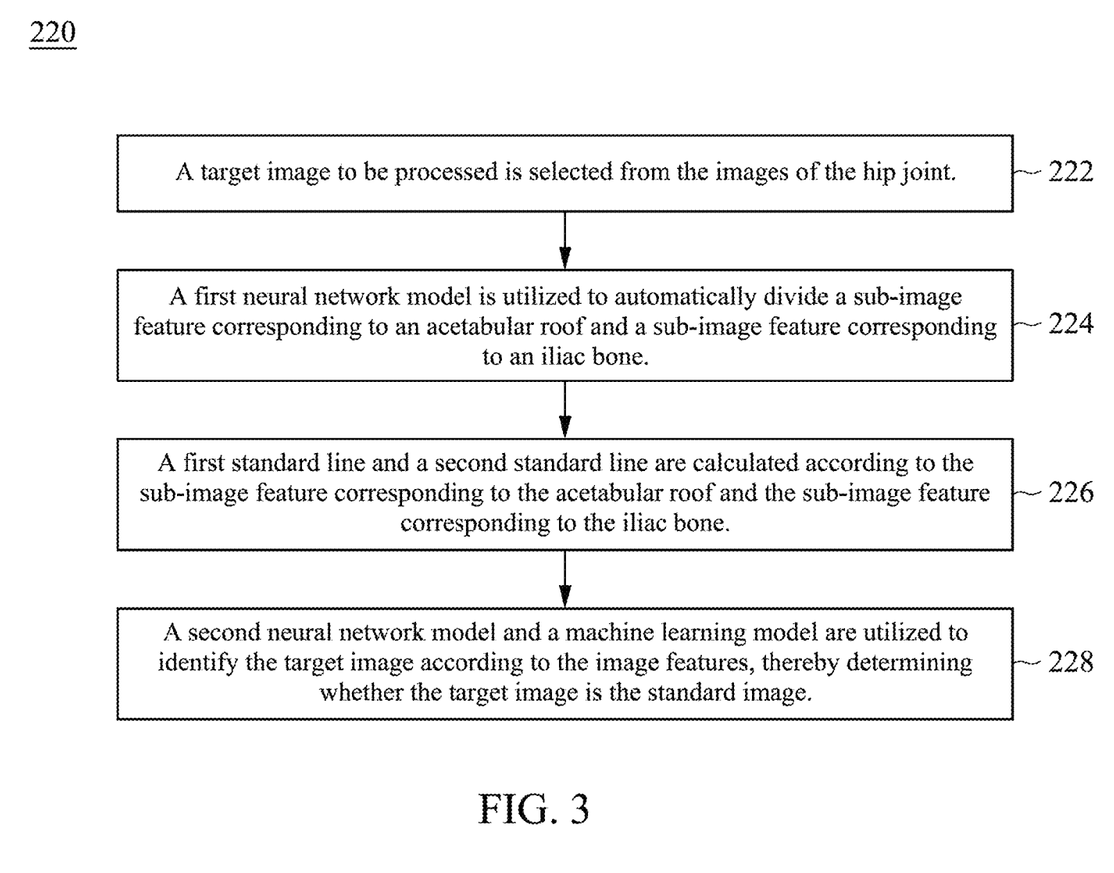
FIG. 3 illustrates a flowchart of the step of the auxiliary screening method for the hip joint of the baby according to some embodiments of the present invention.
Figure 4:
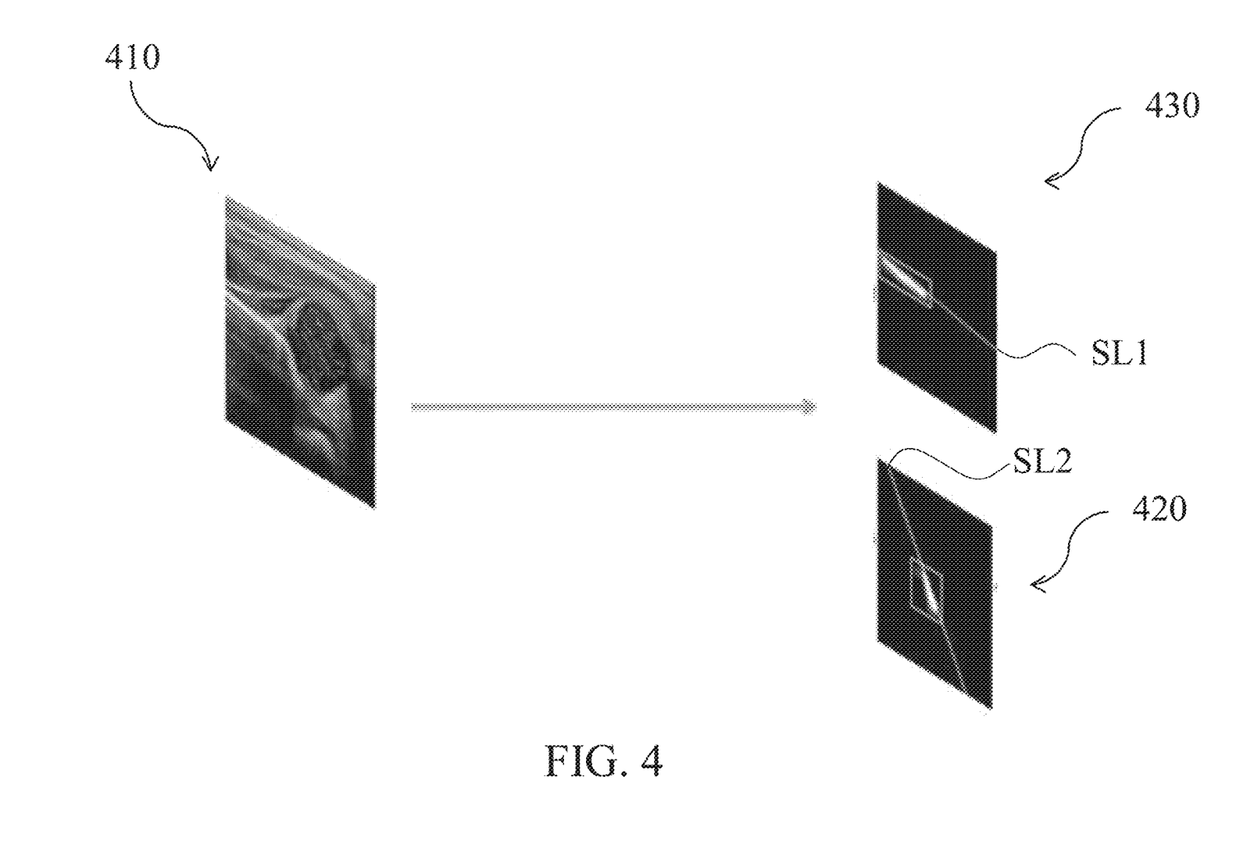
FIG. 4 illustrates a diagram of a sub-image feature corresponding to an acetabular roof, the corresponding first standard line, a sub-image feature corresponding to an iliac bone and the corresponding second standard line according to some embodiments of the present invention.

FIG. 3 illustrates a flowchart of the step 220 of the auxiliary screening method 200 for the hip joint of the baby according to some embodiments of the present invention. In the step 220, a step 222 is firstly performed to select a target image 410 to be processed from the aforementioned images of the hip joint of the baby. Then, the step 224 is performed to utilize a first neural network model to automatically divide a sub-image feature 420 corresponding to the acetabular roof and a sub-image feature 430 corresponding to the iliac bone, as shown in FIG. 4. In some embodiments of the present invention, the first neural network model is established by utilizing a Deep Convolutional Neural Network (DCNN). Then, the step 226 is performed to calculate a first standard line SL1 and a second standard line SL2 (as shown by the white lines in FIG. 4) according to the sub-image feature 420 corresponding to the acetabular roof and the sub-image feature 430 corresponding to the iliac bone. Specifically, the first standard line SL1 is calculated based on the sub-image feature 430 corresponding to the iliac bone, and the second standard line SL2 is calculated based on the sub-image feature 420 corresponding to the acetabular roof. Then, the step 228 is performed to utilize a second neural network model and a machine learning model to identify the target image 410 according to the aforementioned image features, thereby determining whether the target image 410 is the standard image.

Figure 5:
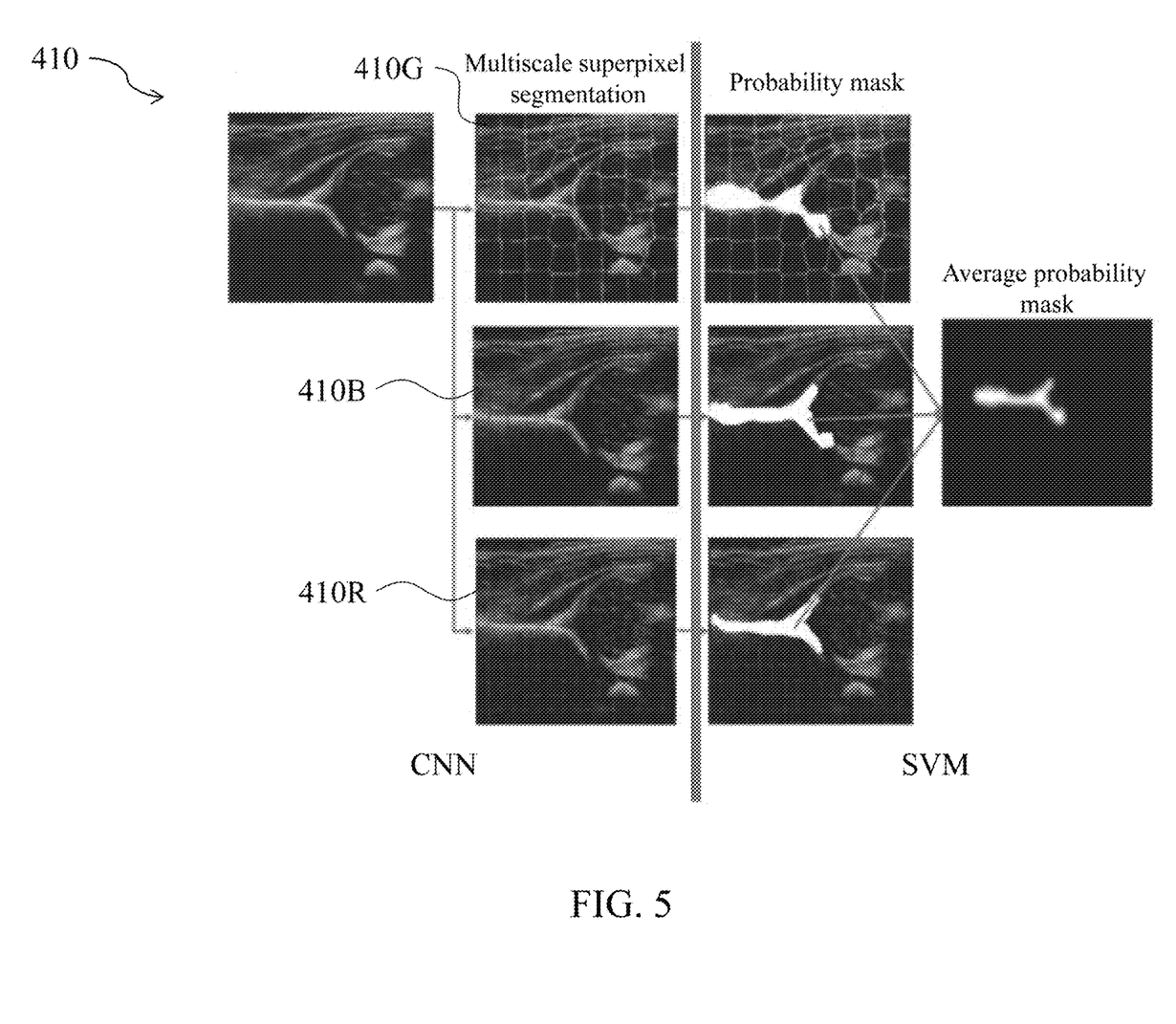
FIG. 5 illustrates a diagram of operations of a Convolutional Neural Network (CNN) model and a Support Vector Machine (SVM) model according to some embodiments of the present invention.

As shown in FIG. 5, in some embodiments of the present invention, the second neural network model is established by utilizing a Convolutional Neural Network (CNN), and the machine learning model is established by utilizing a Support Vector Machine (SVM). The step 220 compares the target image 410 with the standard image by utilizing the neural network model (CNN model) and the machine learning model (SVM model). For example, in the CNN model, the target image 410 can be divided into a red color gamut image 410R, a green color gamut image 410G and a blue color gamut image 410B to respectively perform a multi-scale superpixel segmentation. And then, in the SVM model, the probability mask is utilized to calculate the average probability mask, thereby realizing the identification of the target image 410 to determine whether the target image 410 is a standard image.

Figure 6:
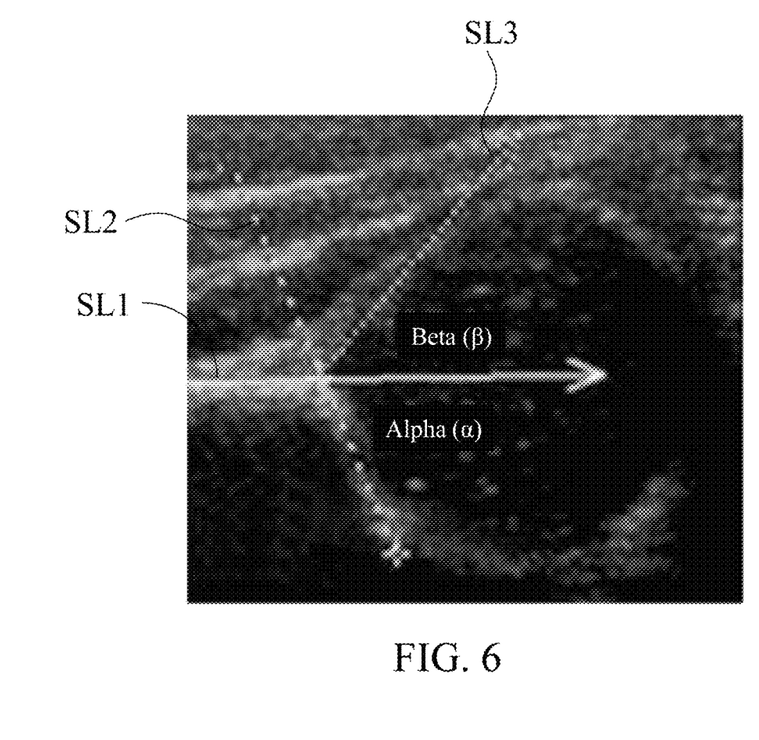
FIG. 6 illustrates a diagram of a first standard line, a second standard line, a third standard line, an angle α and an angle β according to some embodiments of the present invention.

In some embodiments of the present invention, in the aforementioned step 230, a third standard line SL3 may be calculated, and the angle α and the angle β of the hip joint of the baby are calculated by utilizing the first standard line SL1, the second standard line SL2 and the third standard line SL3. For example, the third standard line SL3 is calculated according to the second standard line SL2 and the image feature corresponding to the labrum. Then, as shown in FIG. 6, the angle α of the hip joint of the baby is calculated according to the first standard line SL1 and the second standard line SL2 (shown by the dashed lines with a larger pitch in FIG. 6). As shown in FIG. 6, the angle β of the hip joint of the baby is calculated according to the second standard line SL2 and the third standard line SL3 (shown by the dashed lines with a smaller pitch in FIG. 6). In some embodiments of the present invention, the first standard line SL1, the second standard line SL2, the third standard line SL3, the angle α and the angle β of the hip joint of the baby may be drawn on the image of the hip joint of the baby that is determined as the standard image.

In some embodiments of the present invention, the auxiliary screening method 200 for the hip joint of the baby further includes a model training operation to train the aforementioned first neural network model, the aforementioned second neural network model, and the aforementioned machine learning model. For example, at first, plural training images of the hip joint of the baby are provided. Each of the said training images is labelled as the standard image or a non-standard image. Each of the said training images includes plural labelled image features. The said labelled image features respectively correspond to the chondro osseous border of the hip joint, the femoral head of the hip joint, the synovial fold of the hip joint, the joint capsule of the hip joint, the labrum of the hip joint, the cartilaginous roof of the hip joint, the bony roof of the hip joint and the bony rim of the hip joint. Then, the training images of the hip joint of the baby is utilized to training aforementioned first neural network model, the aforementioned second neural network model, and the aforementioned machine learning model.

From the above description, the auxiliary screening system 100 and the auxiliary screening method 200 for the hip joint of the baby in the embodiments of the present invention utilize the first neural network model (such as the DCNN network model) to find the sub-image feature corresponding to the acetabular roof and the sub-image feature corresponding to an iliac bone, and calculate the first standard line SL1 and the second standard line SL2. Secondly, the auxiliary screening system 100 and the auxiliary screening method 200 for the hip joint of the baby in the embodiments of the present invention integrate the second neural network model (such as a CNN network model) and the machine learning model (SVM model) to perform the determination of the standard image according to the image features respectively correspond to the chondro osseous border of the hip joint, the femoral head of the hip joint, the synovial fold of the hip joint, the joint capsule of the hip joint, the labrum of the hip joint, the cartilaginous roof of the hip joint, the bony roof of the hip joint and the bony rim of the hip joint. Thus, the auxiliary screening system 100 and the auxiliary screening method 200 for the hip joint of the baby in the embodiments of the present invention can search for standard image from the images of hip joint of pediatric patient, and automatically draw the first standard line SL1, the second standard line SL2, the third standard line SL3, and the a angle and the 13 angle of the hip joint after finding the standard image Therefore, the auxiliary screening system 100 and the auxiliary screening method 200 for the hip joint of the baby in the embodiments of the present invention can greatly improve the efficiency of conventional DDH ultrasound screening performed by the doctor. Specifically, the auxiliary screening system 100 and the auxiliary screening method 200 for the hip joint of the baby in the embodiments of the present invention can find and extract the standard image from constantly changing images of hip joint, and omissions may be prevented. Accordingly, the screening time can be shortened and the difficulty of performing ultrasonic scanning can be reduced.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An auxiliary screening system for a hip joint of a baby, comprising:
   an ultrasound imaging equipment configured to collect a plurality of images of the hip joint of the baby; and
   an image analyzing equipment electrically connected to the ultrasound imaging equipment to receive the images of the hip joint of the baby, wherein the image analyzing equipment includes:
   a memory configured to store a plurality of instructions; and
   a processor electrically connected to the memory to load the instructions, wherein the processor executes the instructions to perform operations of:
   performing an image analysis operation on each of the images of the hip joint of the baby to extract a plurality of image features of each of the images of the hip joint of the baby and determining whether each of the images of the hip joint of the baby is a standard image according to the image features of each of the images of the hip joint of the baby; and
   when at least one of the images of the hip joint of the baby is determined as the standard image, calculating a plurality of angle parameters of the at least one of the images of the hip joint of the baby that is determined as the standard image and outputting the at least one of the images of the hip joint of the baby that is determined as the standard image, wherein the angle parameters include values of an angle α and an angle β of the hip joint of the baby.

2. The auxiliary screening system of claim 1,
   wherein the image features respectively correspond to a chondro osseous border of the hip joint, a femoral head of the hip joint, a synovial fold of the hip joint, a joint capsule of the hip joint, a labrum of the hip joint, a cartilaginous roof of the hip joint, a bony roof of the hip joint and a bony rim of the hip joint;
   wherein the image feature corresponding to the bony roof includes a sub-image feature corresponding to an acetabular roof and a sub-image feature corresponding to an iliac bone.

3. The auxiliary screening system of claim 2, wherein when the processor performs the image analysis operation on each of the images of the hip joint of the baby to extract the image features of each of the images of the hip joint of the baby and determines whether each of the images of the hip joint of the baby is the standard image according to the image features of each of the images of the hip joint of the baby, the processor performs operations of:
  selecting a target image from the images of the hip joint of the baby;
  utilizing a first neural network model to automatically divide the sub-image feature corresponding to the acetabular roof and the sub-image feature corresponding to the iliac bone;
  calculating a first standard line and a second standard line according to the sub-image feature corresponding to the acetabular roof and the sub-image feature corresponding to the iliac bone; and
  utilizing a second neural network model and a machine learning model to identify the target image according to the image features, thereby determining whether the target image is the standard image.

4. The auxiliary screening system of claim 3,
  wherein the first neural network model is established by utilizing a Deep Convolutional Neural Network (DCNN),
  wherein the second neural network model is established by utilizing a Convolutional Neural Network (CNN),
  wherein the machine learning model is established by utilizing a Support Vector Machine (SVM).

5. The auxiliary screening system of claim 3, wherein when the processor calculates the angle parameters of the at least one of the images of the hip joint of the baby, the processor performs operations of:
  calculating a third standard line according to the second standard line and the image feature corresponding to the labrum;
  calculating the angle α of the hip joint of the baby according to the first standard line and the second standard line; and
  calculating the angle β of the hip joint of the baby according to the second standard line and the third standard line.

6. The auxiliary screening system of claim 5, wherein the at least one of the images of the hip joint of the baby that is determined as the standard image is drawn with the first standard line, the second standard line and the third standard line.

7. The auxiliary screening system of claim 1, wherein when the processor determines that each of the images of the hip joint of the baby is not the standard image, the processor outputs a warning message to notify that the hip joint of the baby is abnormal.

8. An auxiliary screening method for a hip joint of a baby is provided, wherein the auxiliary screening method for the hip joint of the baby is performed by an auxiliary screening system for the hip joint of the baby, wherein the auxiliary screening method includes:
  collecting a plurality of images of the hip joint of the baby by using an ultrasound imaging equipment;
  performing an image analysis operation on each of the images of the hip joint of the baby to extract a plurality of image features of each of the images of the hip joint of the baby and determining whether each of the images of the hip joint of the baby is a standard image according to the image features of each of the images of the hip joint of the baby; and
  when at least one of the images of the hip joint of the baby is determined as the standard image, calculating a plurality of angle parameters of the at least one of the images of the hip joint of the baby that is determined as the standard image and outputting the at least one of the images of the hip joint of the baby that is determined as the standard image, wherein the angle parameters include values of an angle α and an angle β of the hip joint of the baby.

9. The auxiliary screening method of claim 8,
  wherein the image features respectively correspond to a chondro osseous border of the hip joint, a femoral head of the hip joint, a synovial fold of the hip joint, a joint capsule of the hip joint, a labrum of the hip joint, a cartilaginous roof of the hip joint, a bony roof of the hip joint and a bony rim of the hip joint;
  wherein the image feature corresponding to the bony roof includes a sub-image feature corresponding to an acetabular roof and a sub-image feature corresponding to an iliac bone.

10. The auxiliary screening method of claim 9, wherein operations of performing the image analysis operation on each of the images of the hip joint of the baby to extract the image features of each of the images of the hip joint of the baby and determining whether each of the images of the hip joint of the baby is the standard image according to the image features of each of the images of the hip joint of the baby include:
  selecting a target image from the images of the hip joint of the baby;
  utilizing a first neural network model to automatically divide the sub-image feature corresponding to the acetabular roof and the sub-image feature corresponding to the iliac bone;
  calculating a first standard line and a second standard line according to the sub-image feature corresponding to the acetabular roof and the sub-image feature corresponding to the iliac bone; and
  utilizing a second neural network model and a machine learning model to identify the target image according to the image features, thereby determining whether the target image is the standard image.

11. The auxiliary screening method of claim 10,
  wherein the first neural network model is established by utilizing a Deep Convolutional Neural Network (DCNN),
  wherein the second neural network model is established by utilizing a Convolutional Neural Network (CNN),
  wherein the machine learning model is established by utilizing a Support Vector Machine (SVM).

12. The auxiliary screening method of claim 11, further comprising:
  performing a model training operation to train the second neural network model and the machine learning model, wherein the model training operation includes:
  providing a plurality of training images of the hip joint of the baby, wherein the training images of the hip joint of the baby include a plurality of labelled image features, wherein the labelled image features respectively correspond to the chondro osseous border of the hip joint, the femoral head of the hip joint, the synovial fold of the hip joint, the joint capsule of the hip joint, the labrum of the hip joint, the cartilaginous roof of the hip joint, the bony roof of the hip joint and the bony rim of the hip joint; and utilizing the training images of the hip joint of the baby to training the second neural network model and the machine learning model.

13. The auxiliary screening method of claim 10, wherein operations of calculating the angle parameters of the at least one of the images of the hip joint of the baby include:
  calculating a third standard line according to the second standard line and the image feature corresponding to the labrum;
  calculating the angle α of the hip joint of the baby according to the first standard line and the second standard line; and
  calculating the angle β of the hip joint of the baby according to the second standard line and the third standard line.

14. The auxiliary screening method of claim 13, further comprising:
  drawing the first standard line, the second standard line and the third standard line on the at least one of the images of the hip joint of the baby that is determined as the standard image.

15. The auxiliary screening method of claim 8, wherein when determining that each of the images of the hip joint of the baby is not the standard image, a warning message is outputted to notify that the hip joint of the baby is abnormal.

\* \* \* \* \*